May 10, 1932.  W. L. JONES  1,857,551
TIRE DEFLATION INDICATOR
Filed July 18, 1930
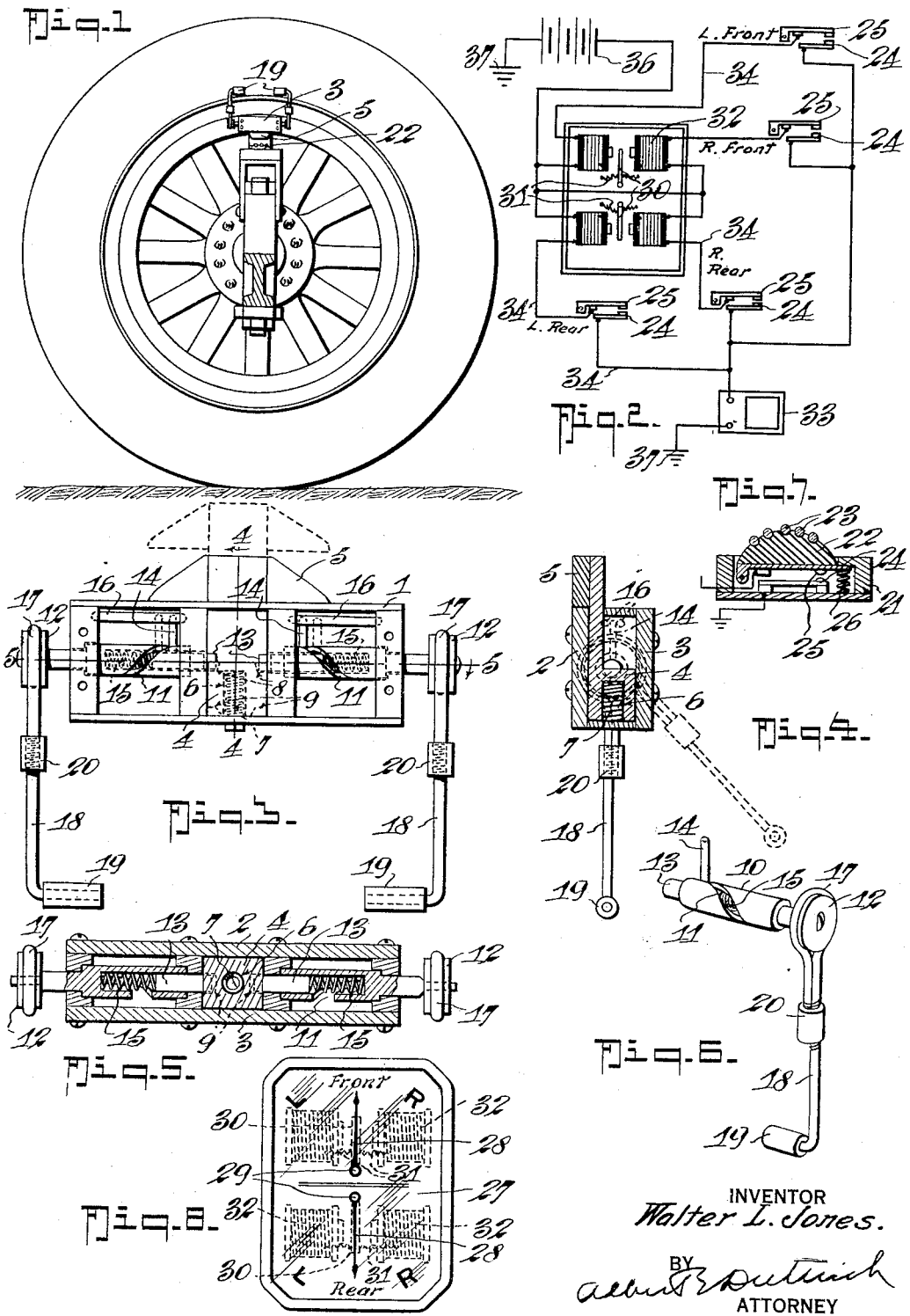
INVENTOR
Walter L. Jones.
BY
ATTORNEY Patented May 10, 1932

1,857,551

UNITED STATES PATENT OFFICE

WALTER L. JONES, OF ST. LOUIS, MISSOURI

TIRE DEFLATION INDICATOR

Application filed July 18, 1930. Serial No. 468,937.

My invention relates to signalling devices and particularly to devices for giving a visual and an audible signal when the air pressure in one or more of the pneumatic tires of a motor vehicle drops to a point where further driving would cause injury to the tire or tires.

Primarily, the invention has for its object to provide a signalling device for the purpose referred to, which will be of a simple, inexpensive nature, yet sufficiently rugged in its construction effectively to serve its intended purposes.

Further, the invention has for its object to provide a signalling device which will not give a false indication.

Further, it is an object to provide a signalling device composed of but three units or major parts, one a wheel-carried unit, one a stationarily mounted unit or switch, located to cooperate mechanically with the wheel-carried unit, and the third a dash-mounted unit giving the final indications.

Further, it is an object to provide a signalling apparatus, the wheel-carried unit of which is of the purely mechanically operated kind, i. e. it has no part located in an electric circuit, thus eliminating danger of circuit closing by centrifugal force and causing false signals.

Further, it is an object to provide a wheel-carried unit having duplicate actuators so designed that they contact the tire at two places sufficiently separated so that deflection of the tire under normal running conditions will not cause both actuators to move to the released position at the same time: i. e. if only one actuator were used the switch operating or contact head of the wheel-carried unit would sometimes be released by the temporary bulging of the side wall of the tire due to the tire striking a hole or a road bump, or a railway crossing, and thus give a false signal.

Further, the invention has for an object to provide a dash or indicator unit of a neat appearance, a compact, simple arrangement that will harmonize with the other instruments on the instrument panel of the vehicle.

Further, it is an object to provide means to reduce friction between the tire and the actuators of the wheel-carried unit and also between the wheel-carried unit and the fixed unit.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a side elevation of a portion of a vehicle showing the wheel and fixed unit.

Figure 2 is a diagrammatic view showing the relation of the several units to each other.

Figure 3 is an enlarged elevation of one of the wheel-carried units, the outer cover being removed and the parts being in the normal position in full lines and indicated in the released position in dotted lines.

Figure 4 is a cross section on the line 4—4 of Figure 3.

Figure 5 is a horizontal section on the line 5—5 of Figure 3.

Figure 6 is a detail perspective view of one of the actuators per se.

Figure 7 is a vertical longitudinal section of the fixed unit or switch.

Figure 8 is a detail view of the dash unit.

In the drawings, in which like numerals of reference indicate like parts in all of the figures, 1 represents the casing of the wheel-carried unit which includes the rear cover 2 and the front cover 3. A slide block 4 is a part of the unit and carries a T-arm 5, the head of which is adapted in the normal position to lie close to the casing 1 and in the released position to be projected a sufficient distance from the casing to cooperate mechanically with the pivoted extension piece 22 of the fixed unit hereinafter again referred to.

The slide block 4 has a release spring recess 6 in which the block-moving spring 7 is socketed. The block also has a pair of actuator seats 8 and 9 respectively to cooperate with the projected ends 13 of the actuator barrels 10. There are two actuators to each wheel-carried unit, and as the construction of each actuator is the same a detailed description of one will be sufficient.

Each actuator comprises the barrel 10 which has a spiral slot 11 and carries a grooved hub 12. The barrel 10 is hollow and in it is mounted a short rod 13 that carries a pin 14 which projects through the slot 11 and into position between guide rods 16, there being a push spring 15 in the barrel 10 continuously tending to force the rod 13 toward the block 4 so as to project the end of the rod 13 into one or the other of the seats 8 or 9 accordingly as the block 4 is in the normal or released positions.

Each actuator also includes an arm 18 which is provided with a clamping loop 17 that encircles the hub 12 and is held in tight engagement with it by means of a clamping collar 20. There may be a threaded engagement between the collar 20 and the arm 18 if desired.

The arm 18 at its outer or free end carries an anti-friction roller 19 that is adapted to lie in contact with the side wall of the tire.

21 is the casing of the fixed unit in which is mounted the pivoted extension piece 22 whose operating surface is provided with anti-friction rollers 23, and the stationarily mounted contact spring 24 which cooperates with the contact element 25 on the pivoted extension piece 22 for the purpose of closing the electric circuit.

A spring 26 serves normally to maintain the extension piece 22 in its extended position.

The dash unit comprises a dial 27, indicators 28 pivoted at 29 and armatures 30 moving with the indicators as a unit and cooperating with the armature magnets 32, there being, preferably, light armature balancing springs 31 provided to keep the armatures centralized with the magnets and not energized.

33 is a signal buzzer which is connected in circuit with the various magnets 32.

34 is the circuit wiring from each of the contact elements 25 to the respective magnets 32, while 35 indicates the connection from the battery to the magnets 32. The battery is indicated in the diagram by 36 and the ground connections by 37 and the buzzer by 33.

Operation

In the practical use of my invention one of the wheel-carried units is mounted upon the rim of each wheel of the vehicle in such a position that the arm 5 will move in a radial direction and the actuator arms 18 will lie against the side wall of the tire adjacent the rim at two relatively widely separated points, i. e. at two points sufficiently separated so that an accidental excessive deflection of the side wall will not operate both actuator arms at the same time. One of the fixedly located switch units is also mounted on the chassis adjacent each wheel to be operated by the head of the projecting arm of the wheel-carried unit when it shall have been released. Each fixedly located switch unit is wired up with the indicator on the dash as hereinbefore described so that it will be obvious if one of the tires deflates sufficiently to operate both actuator arms of its particular wheel-carried unit to an extent sufficient to release the slide block of that unit, the arm of that unit will be projected and caused to close the circuit of the corresponding switch unit and thereby operate the buzzer and set the proper indicator on the dash.

By having the indicator balanced, a pulsating effect will be given to the indicator by the closing of the circuit once in each revolution of the wheel, thus attracting the attention of the driver even though the buzzer signal should be out of order.

If both front tires should deflate at the same time so as to energize the indicator magnets the indicator finger will alternately move from one side to the other as the circuits are closed by the rotating wheels, thus indicating that both tires have been deflated. A similar action takes place upon deflation of one or both of the rear tires.

From the foregoing description, taken in connection with the accompanying drawings, it is thought the complete construction, operation and advantages of my invention will be clear to those skilled in the art to which it relates.

What I claim is:

1. In a tire deflation indicator wherein is provided a fixedly located circuit closer actuated by a wheel-carried unit; a wheel-carried unit comprising a casing, a slide block mounted in the casing, an arm carried by the slide block and movable with and radially of the wheel, a pair of block holding latch members, an actuator for each latch member, said actuators including separated arms for engaging the side wall of the tire adjacent the rim of the wheel.

2. In a tire deflation indicator wherein is provided a fixedly located circuit closer actuated by a wheel-carried unit; a wheel-carried unit comprising a casing adapted for mounting on the rim of a wheel, a slide block mounted in the casing and having an arm projecting through the casing toward the axis of the wheel, said block and arm being movable radially of the wheel and transversely of the casing, block latching means mounted on the casing, said block latching means including a latch rod and pin, means engaging with said pin to hold said latch rod against turning, an actuator comprising a barrel to receive said rod and having a spiral slot through which said pin projects, an actuator arm secured to said actuator barrel and engaging the side wall of the tire whereby abnormal flattening of the tire will rock said barrel and release said latch rod from said slide block, and spring means continuously tending to maintain said latch rod and said actuator barrel and arm in the latching position, and means for projecting said arm when said block is released.

3. In a tire deflation indicator wherein is provided a fixedly located circuit closer actuated by a wheel-carried unit; a wheel-carried unit comprising a casing adapted for mounting on the rim of a wheel, a slide block mounted in the casing and having an arm projecting through the casing toward the axis of the wheel, said block and arm being movable radially of the wheel and transversely of the casing, block latching means mounted on the casing, said block latching means including a latch rod and pin, means engaging with said pin to hold said latch rod against turning, an actuator comprising a barrel to receive said rod and having a spiral slot through which said pin projects, an actuator arm secured to said actuator barrel and engaging the side wall of the tire whereby abnormal flattening of the tire will rock said barrel and release said latch rod from said slide block, and spring means continuously tending to maintain said latch rod and said actuator barrel and arm in the latching position, and means for projecting said arm when said block is released, said slide block having upper and lower latch rod receiving portions.

4. In a tire deflation indicator wherein is provided a fixedly located circuit closer actuated by a wheel-carried unit; a wheel-carried unit comprising a casing adapted for mounting on the rim of a wheel, a slide block mounted in the casing and having an arm projecting through the casing toward the axis of the wheel, said block and arm being movable radially of the wheel and transversely of the casing, two block latching means mounted on the casing and each including a latch rod and pin, means engaging with said pin to hold said latch rod against turning, an actuator comprising a barrel to receive said rod and having a spiral slot through which said pin projects, an actuating arm secured to said actuator barrel and engaging the side wall of a tire whereby abnormal flattening of the tire will rock said barrel and release said latch rod from said slide block, and spring means continuously tending to maintain said latch rod and actuator barrel and arm in their latching position, and means for projecting said arm when said block is released by both latch rods.

5. In tire deflation indicators wherein a switch is fixedly located adjacent each wheel for closing an electric signalling circuit; a wheel-carried unit comprising a support, a switch closing arm carried by said support, means normally holding said arm from actuating said switch, and other means to release said arm and cause it to actuate said switch upon excessive deflation of a tire, said holding and releasing means including duplicate latches, and latch withdrawing elements, the latter having arms to engage with the side walls of a tire at two different locations substantially as and for the purposes specified.

6. In a tire deflation signalling apparatus, a wheel-carried unit comprising an elongated casing securable to the felloe or rim of a wheel with its longitudinal axis lying in the general direction of the periphery of the wheel, said casing having transverse guides, a slide block mounted between said guides, an arm carried by said slide block and extending through the casing radially of the wheel, a spring in said casing engaging said block to project its arm, two sets of block holding devices for latching said block in either the arm-extended or arm-retracted position accordingly as said block is in one position or another, each of said holding devices comprising a latch rod, an actuator barrel rotatably mounted in said casing to receive said latch rod, means connecting said barrel and its latch rod for converting rotary motion of the barrel into reciprocating movement of the latch rod, means continuously tending to move said latch rod to its latching position, and an actuator arm carried by the barrel to engage the inside wall of a tire for rotating said barrel to release its latch upon abnormal deflation of the tire.

7. In a tire deflation signalling apparatus, a wheel-carried unit comprising an elongated casing securable to the felloe or rim of a wheel with its longitudinal axis lying in the general direction of the periphery of the wheel, said casing having transverse guides, a slide block mounted between said guides, an arm carried by said slide block and extending through the casing radially of the wheel, a spring in said casing engaging said block to project its arm, two sets of block holding devices for latching said block in either the arm-extended or arm-retracted position accordingly as said block is in one position or another, each of said holding devices comprising a latch rod, and actuator barrel rotatably mounted in said casing to receive said latch rod, means connecting said barrel and its latch rod for converting rotary movement of the barrel into reciprocating movement of the latch rod, means continuously tending to move said latch rod to its latching position, said barrel having a grooved hub on its outer arm, an actuator arm having a clamp loop in the groove of said hub, said arm having an anti-friction roller at its tire-engaging end.

8. In a tire deflation signalling apparatus, a wheel-carried unit comprising an elongated casing securable to the felloe or rim of a wheel with its longitudinal axis lying in the general direction of the periphery of the wheel, said casing having transverse guides, a slide block mounted between said guides, an arm carried by said slide block and extending through the casing radially of the wheel, a spring in said casing engaging said block to project its arm, two sets of block holding devices for latching said block in either the arm-extended or arm-retracted position accordingly as said block is in one position or another, each of said holding devices comprising a latch rod, an actuator barrel rotatably mounted in said casing to receive said latch rod, means connecting said barrel and its latch rod for converting rotary movement of the barrel into reciprocating movement of the latch rod, means continuously tending to move said latch rod to its latching position, and an actuator arm carried by the barrel to engage the side wall of a tire for rotating said barrel to release its latch upon abnormal deflection of the tire, said barrel and rod connecting means including a pin on said rod projecting through a spiral slot in said barrel, and a fixed pin-guide in the casing.

9. In tire deflation indicators wherein a switch is fixedly located adjacent each wheel for closing an electric signalling circuit; a wheel-carried unit comprising a support, a switch closing arm carried by said support, means normally holding said arm from actuating said switch, and other means to release said arm and cause it to actuate said switch upon excessive deflation of a tire, said holding and releasing means including duplicate latches, and latch withdrawing elements, the latter having arms to engage with the side walls of a tire at two different locations, each switch closing arm having a head with anti-friction elements for engaging said tire.

WALTER L. JONES.